United States Patent

Herrmann et al.

[11] Patent Number: 5,482,584
[45] Date of Patent: Jan. 9, 1996

[54] METHOD FOR MANUFACTURING ROTOR BLADES

[75] Inventors: Axel S. Herrmann, Lehrte; Volker Krajenski; Arno E. R. K. Pabsch, both of Braunschweig, all of Germany

[73] Assignee: Deutsche Forschungsanstalt fur Luft- und Raumfahrt e.V., Cologne, Germany

[21] Appl. No.: 323,386

[22] Filed: Oct. 14, 1994

[30] Foreign Application Priority Data

Oct. 15, 1993 [DE] Germany .......................... 43 35 221.9

[51] Int. Cl.⁶ .................. B65H 81/00; B64C 27/46
[52] U.S. Cl. .................. 156/172; 29/889.71; 74/579 R; 416/241 A
[58] Field of Search .................. 416/229 R, 230 R, 416/230 A, 232, 241 A; 156/169, 172; 74/579 R; 29/889, 889.7, 889.71, 889.72, 889.6

[56] References Cited

U.S. PATENT DOCUMENTS

| | | | |
|---|---|---|---|
| 3,057,767 | 10/1962 | Kaplan | 416/241 A |
| 3,476,484 | 11/1969 | Brunsch | 416/230 A |
| 3,943,020 | 3/1976 | Ashton et al. | |
| 4,083,656 | 4/1978 | Braswell et al. | |
| 4,260,332 | 4/1981 | Weingart et al. | |
| 4,412,784 | 11/1983 | Wackerle et al. | |
| 4,494,910 | 1/1985 | Hahn et al. | 416/226 |
| 4,603,084 | 7/1986 | Drachenberg et al. | 74/579 R |
| 5,269,658 | 12/1993 | Carlson et al. | 416/230 |

FOREIGN PATENT DOCUMENTS

| | | |
|---|---|---|
| 2321997 | 3/1977 | France . |
| 1952520 | 5/1970 | Germany . |
| 0314347 | 10/1981 | Germany . |
| 2164618 | 3/1986 | United Kingdom . |

OTHER PUBLICATIONS

*Product Engineering*, vol. 50 (5): 43–45.

Primary Examiner—Michael W. Ball
Assistant Examiner—David W. Reed
Attorney, Agent, or Firm—Salter & Michaelson

[57] ABSTRACT

A rotor blade is made of fibre-reinforced synthetic resin and comprises a moulded core with central, front and rear elements and a foot end fastening element, a unidirectional fibre layer being wound longitudinally of the core, a first cross-binding lying over the fibre layer and a second cross-binding forming a covering for the entire assembly.

5 Claims, 6 Drawing Sheets

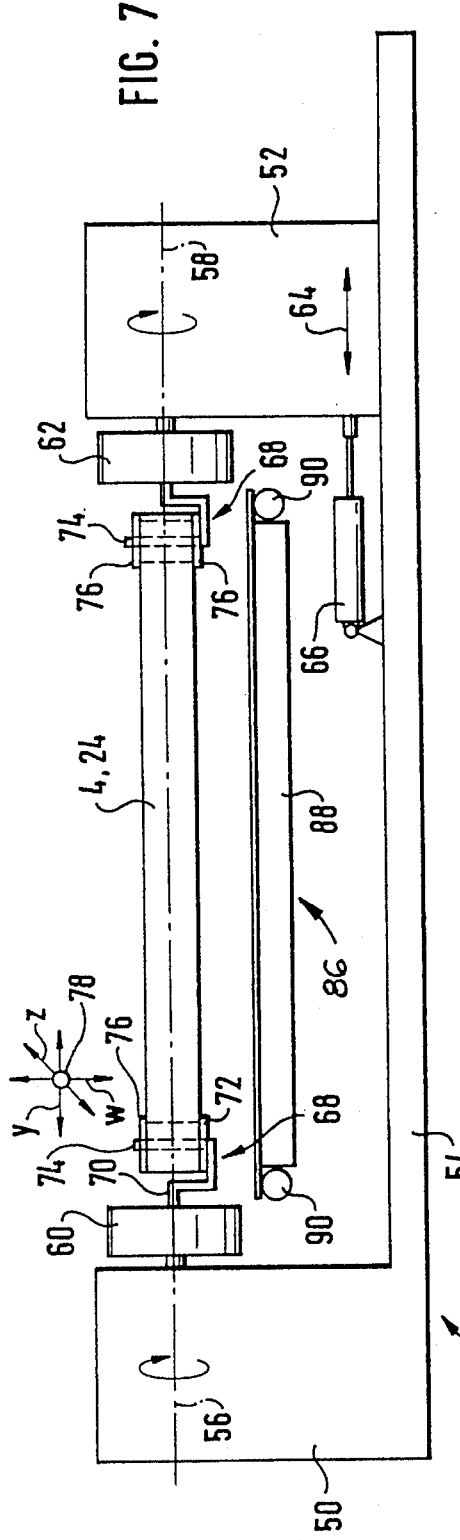
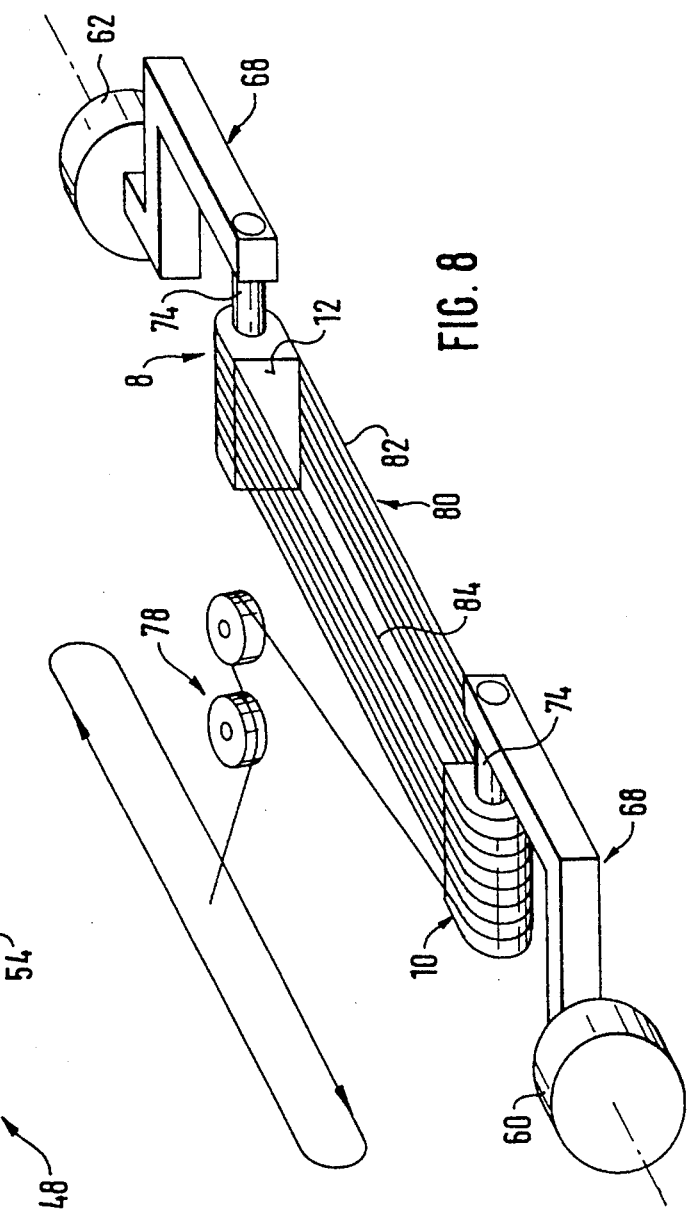

METHOD FOR MANUFACTURING ROTOR BLADES

BACKGROUND OF THE INVENTION

The invention relates to rotor blades made of fibre-reinforced synthetic resins, particularly rotor blades for wind turbines, and to a method of making such blades.

Rotor blades made of fibre-reinforced synthetic resins are usually made up of two rotor blade shells which are laminated in a negative mould by the hand lay-up moulding process. In keeping with the size of the blades, spar elements are fitted and are divided in the plane in which the two rotor blade shells are divided. Such spars may be metal constructions. It is also known to fill the blade shells at least partly with a foam plastic, which is ground smooth in the plane in which the blade shells are divided. The shells thus structured are joined together by adhesion (DE-26 11 235 A1; DE-30 14 347 A1). Rotor blades constructed in this way are on the one hand expensive to produce; and in addition the internal adhesive bonds joining the two rotor blade shells are difficult to check.

Another known rotor blade has a separate blade root with a shell of fibre-reinforced synthetic resin supported by a foam core. The foam core comprises blocks of foam plastic assembled from individual blocks. The root of the rotor blade has an internal cross-binding wound on an arbor which can be fixed in a winding machine; the foam plastic blocks are adhesively bonded to the cross-binding and form a supporting core for a rotor blade spar. Laminates made of unidirectional fibres extending longitudinally of the core are applied to the core in its longitudinal direction. A cross-binding applied in the winding process is provided over the fibre laminate. Foam plastic filling pieces are adhesively bonded to the spar thus structured, and form the front and rear edges of the core of the blade profile. The blade shell is put over it as a cross-binding (DE 31 14 567 A1, U.S. Pat. No. 4,494,910). In the manufacturing process the core is drawn out of the rotor blade when the rotor blade shell has been applied and cured; the core is required during manufacture in order to prevent the rotor blade from being deformed in the winding machine.

SUMMARY OF THE INVENTION

The present invention seems to provide a rotor blade which, even if it has large dimensions, can be produced without a core in a winding machine, in a process which can largely be made automatic.

In accordance with a first aspect of the present invention, there is provided a rotor blade having a foot end, said blade being made of fibre-reinforced synthetic resin material and comprising a multi-part moulded core having a central spar element having a longitudinal axis and a front and a rear profile element attached to said spar element, a unidirectional fibre layer binding arranged at the top and underside in the direction of said longitudinal axis of the spar element, at least part of said unidirectional fibre layer extending over the whole length of said rotor blade, a metallic fastening element for said rotor blade, arranged at said foot end of said blade, said unidirectional fibre layer binding being placed around said fastening element whereby said spar element is rigidly connected to said fastening element by said unidirectional fibre layer binding, a first cross-binding lying on said unidirectional fibre layer binding, and a second cross-binding, arranged over the whole of said moulded core with said spar element and said front and rear profile elements attached thereto, said second cross-binding constituting a rotor blade covering.

In accordance with a second aspect of the present invention, there is provided a method of making rotor blades made of fibre-reinforced synthetic resin, the method using a winding machine with first and second opposing, aligned grip heads provided with a synchronous drive a holder for holding a fastening element non-rotatably in said first grip head, means held non-rotatably in said second opposing grip head, for deflecting blade fibres, and means for generating a tensile force axially of said grip heads, the method comprising the steps of making a holding binding comprising only a relatively small plurality of unidirectional fibre runs between said fastening element and said fibre-deflecting means, inserting a blade spar element between said runs of said holding binding, applying a tensile stress to said fibres of said holding binding, to such a degree that said blade spar element is held by said runs of said holding binding without sagging, applying further binding runs to complete said unidirectional fibre binding, applying a cross-binding to said unidirectional fibre binding with rotation of said grip heads, attaching front and rear blade profile elements, applying an outer cross-binding with rotation of said grip heads, releasing the thus bound rotor blade and lowering it into a first rigid component of a mould defining the profile of a finished blade, closing a mould with a second rigid mould component, pressing the rotor blade between said mould components and curing said blade in said mould.

BRIEF DESCRIPTION OF THE DRAWINGS

Preferred embodiments of the present invention will now be described, by way of example only, with reference to the accompanying drawings, of which:

FIG. 7 shows a binding machine to manufacture the rotor blade, FIGS. 8–11 show steps in the process of making the rotor blade and FIG. 12 shows the manufacture of a rotor blade without an end element tied in at the tip of the blade.

DESCRIPTION OF THE PREFERRED EMBODIMENTS

Figure 1:
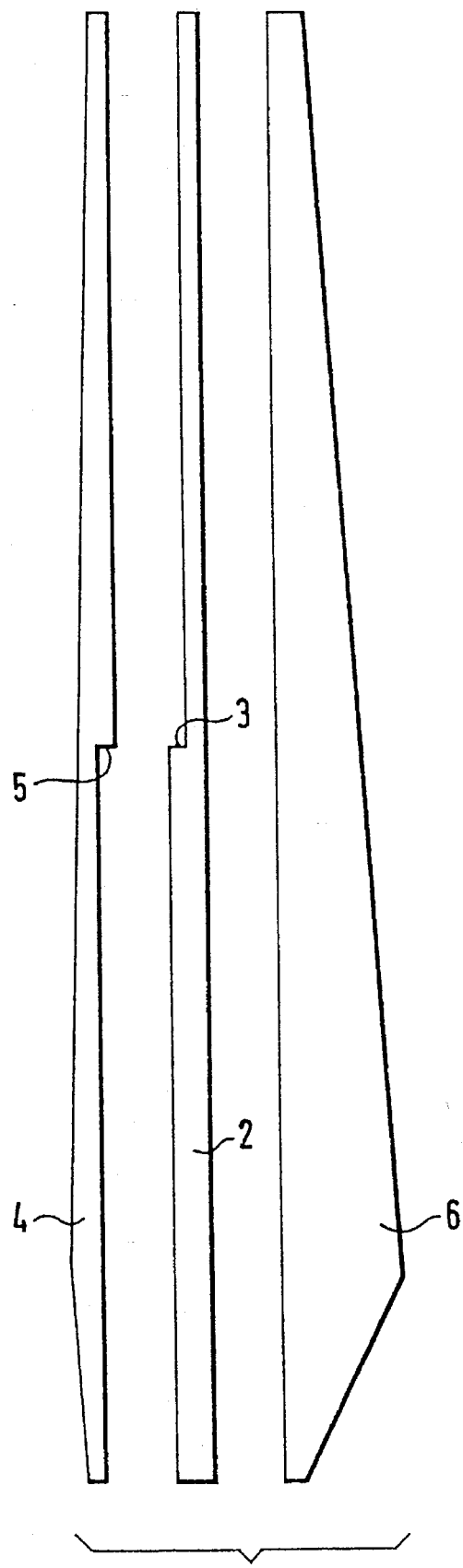
FIG. 1 is a plan view of a moulded core of a rotor blade according to the invention.

Basically the present invention provides a rotor blade made of fibre-reinforced synthetic resin for wind turbines and comprising the following elements:

a multi-part moulded core which has a central spar element and a front and a rear profile element attached to the spar element, a unidirectional fibre layer arranged at the top and underside in the direction of the longitudinal axis of the spar, in which at least part of the unidirectional fibre layers extends over the whole length of the rotor blade, a metallic fastening element for the rotor blade, arranged at the foot end of the blade, around which the unidirectional fibre binding is placed so that the spar element is rigidly connected to the fastening element by the unidirectional fibre binding, a cross-binding lying on the unidirectional fibre layer, and a cross-binding, laid down over the whole moulded core with the spar element and the front and rear profile elements attached to it, as a rotor blade shell.

It is desirable to arrange a first layer of unidirectional fibres, comprising only a few fibres, on the spar element of the core and extending over the whole length of the spar element, and to arrange an inner cross-binding on that first layer, with the other fibres of the unidirectional fibre layer lying on the cross-binding.

A metallic insert may be tied into the rotor blade at the tip of the blade by the unidirectional fibre layer.

In very long rotor blades the spar element may be stepped in the longitudinal direction and constructed with at least one transverse shoulder, so that part of the unidirectional fibre binding is wound over the fastening element at the foot end of the rotor blade, over the transverse shoulder or shoulders.

The fastening element may be constructed with at least one hole extending across the longitudinal axis of the spar, and a binding shoulder formed rotationally symmetrically with the axis of the hole.

The fastening element at the foot end of the rotor blade may alternatively be a fastening flange with fastening bolts parallel with the spar axis, over which bolts the unidirectional fibres are wound, and a covering flange may be provided for their protection.

A thermoplastic film is preferably arranged on the surface of the blade and joined to the synthetic resin over the whole area.

The core elements may be made of a pressure-resistant foam or may alternatively be in the form of hollow bodies, particularly inflatable ones.

The present invention also provides a method of making rotor blades using a winding machine comprising two opposing, aligned grip heads provided with a synchronous drive a holder for holding the fastening element non-rotatably in one of the grip heads, means held non-rotatably in the opposing grip head, for deflecting the fibres, and means for generating a tensile force axially of the grip heads, the method comprising the steps of making a holding binding comprising only a few unidirectional fibre runs between the fastening element and the opposing deflecting means, inserting the spar element between the runs of the holding binding, applying a tensile stress to the fibres of the holding binding, to such a degree that the spar member is held by the runs of the holding binding without sagging, applying further binding runs to complete the unidirectional fibre binding, applying a cross-binding to the unidirectional fibre binding with rotation of the grip heads, attaching the front and rear profile elements, applying an outer cross-binding with rotation of the grip heads, releasing the bound rotor blade and lowering it into a first rigid component of a mould defining the profile of the finished blade, closing a mould with a second rigid mould component, pressing the rotor blade between the mould components and curing the blade in the mould.

A first inner cross-binding is preferably applied after the application of the tensile stress to the holding binding of unidirectional fibres following the insertion of the spar element.

A binding shoulder located across the axis of rotation or a binding cap may be used as deflecting means at the tip of the blade.

The invention seeks to provide a rotor blade made of fibre-reinforced synthetic resins, which can be manufactured in a largely automatable production process and which avoids considerable disadvantages of known rotor blades.

Referring to the drawings, a rotor blade according to the invention has a moulded core corresponding to the contour of the finished blade. The core is divided into three elements which are illustrated in FIG. 1. These are a spar element 2, a front profile element 4 and a rear profile element 6. The element 4 forms the projecting profile and the element 6 the trailing section.

The three elements 2, 4, 6 of the moulded core may be made of a pressure-resistant foam plastic, for example foamed polystyrene or polyurethane foam. The plastic should have a closed surface. The elements 2, 4, 6 of the core may alternatively be hollow bodies, which may be blow-moulded in known manner. If they have large dimensions it is advisable to make them by the sinter casting process, preferably the wobble sintering process. The material used may in known manner be polyamide, polypropylene or polystyrene. The shape and dimensions of the core correspond to the shape of the finished rotor blade less the thickness of the skin on the blade. If the rotor blade is to be made by the method described below the core elements only need to have slight rigidity. They may also be divided longitudinally.

Figure 2:
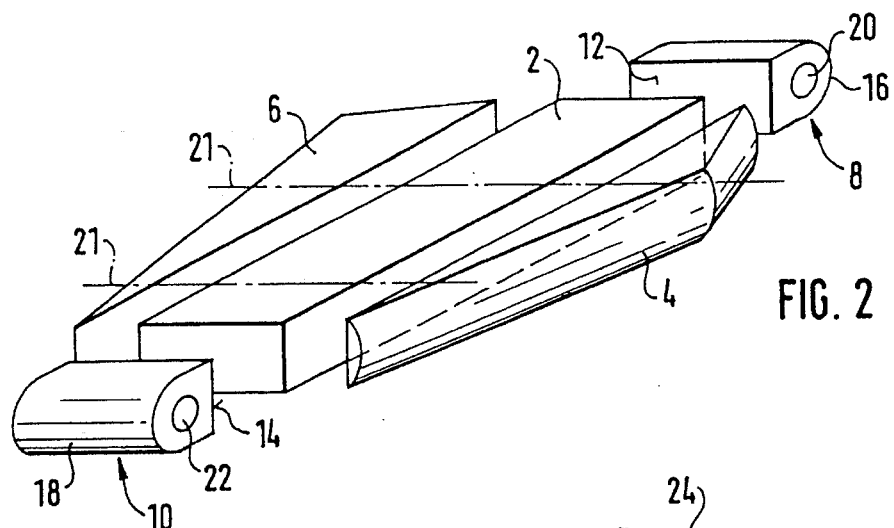
FIG. 2 is an embodiment of a spar element with deflecting and/or fastening elements.

The spar element 2 is illustrated diagrammatically as a cuboid in FIG. 2. End elements 8, 10 with flat surfaces 12, 14 are shown at its ends. These flat surfaces enable the end elements 8 and 10 to lie against flat end surfaces of the spar element 2 of the moulded core. The end elements 8, 10 each have a rounded shoulder 16 and 18 respectively, and in this embodiment holes 20 and 22 extending across the length of the spar element 2. The end element 10 at the foot of the rotor blade, which is constructed as an element to attach the blade to the rotor hub, may also contain a plurality of transverse holes. The end elements 8, 10 are preferably made of metal. Their surfaces facing towards the spar element 2 may alternatively be curved. The end elements may, for example, be produced as rotary parts. FIG. 2 further shows the two profile elements 4 and 6 which are added to the spar element to complete the moulded core.

Figure 3:
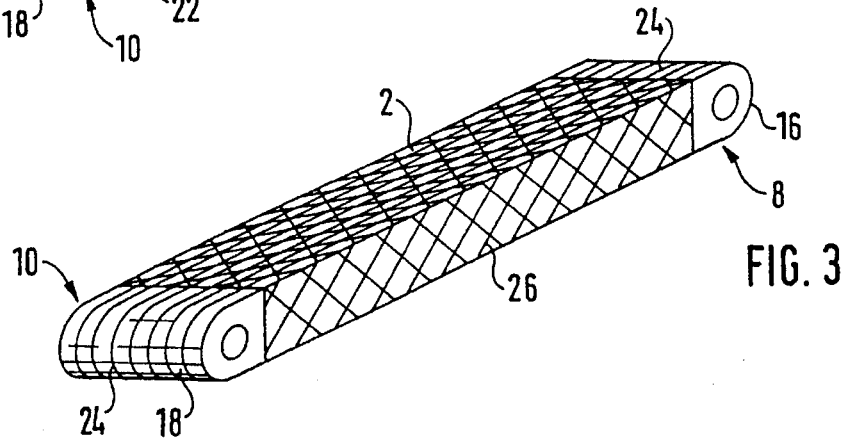
FIG. 3 shows the spar element with a unidirectional binding and a cross-binding applied to it.

As illustrated in FIG. 3, a binding 24 of unidirectional fibres is wound over the end elements 8 and 10 and the spar element 2 between them; it extends longitudinally of the element 2 and is taken round over the rounded shoulders 16, 18 of the end elements. A cross-binding 26 is arranged over the binding 24 on the spar element 2.

The spar element 2 keeps the runs of the binding 24 apart a distance predetermined by the thickness of the element 2, and the binding 24 gives the rotor blade the required rigidity, while the cross-binding 26 determines the torsion-proof properties of the element 2. A first cross-binding (not shown) may be provided under the binding 24 to improve shear coupling.

When the rotor blades are very long, for example longer than 5 m, it is not necessary to take the whole binding of unidirectional fibres over the whole length of the spar element 2. As shown in FIG. 1, the spar element 2 may then be constructed with one or even more than one step 3, with deflecting shoulders extending across the longitudinal axis of the rotor blade, round which shoulders the corresponding part of the binding of unidirectional fibres is wound. In such a construction of the spar element the rear of the profile element 4 has a step 5 corresponding to the step 3, as illustrated in FIG. 1.

The front and rear profile elements 4, 6 are attached to the spar element 2 with its longitudinal binding 24 and the cross-binding 26, and transverse pegs 21 or the like may be provided to determine the exact position of the three elements 2, 4, 6 of the moulded core relative to each other. The spar element 2 wound round as described above and the front and rear profile elements 4 and 6 attached to it form the bound core for the skin of the rotor blade.

Figure 4:
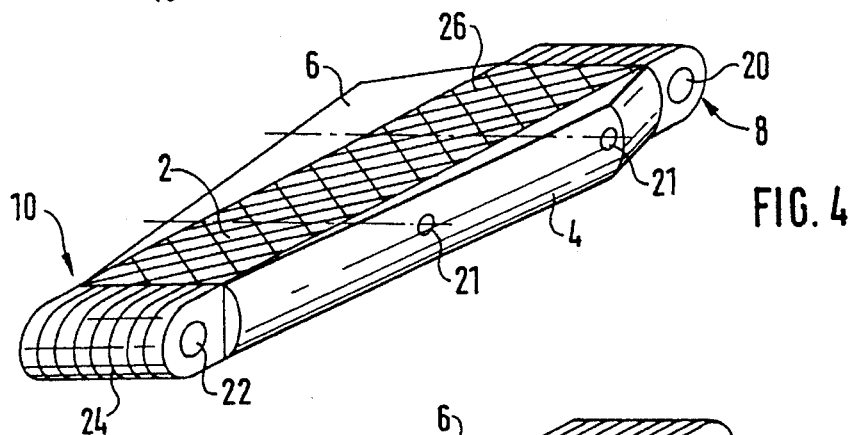
FIG. 4 shows the spar element of FIG. 3 with a front and rear profile element joined to it.
Figure 5:
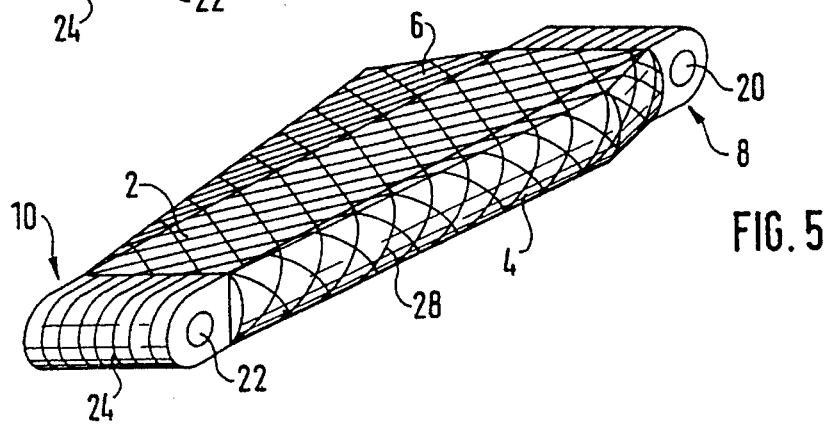
FIG. 5 shows the fully bound rotor blade.

As illustrated in FIG. 5, the skin of the rotor blade is formed by a cross-binding 28 which is wound round the bound core as shown in FIG. 4.

The spar element 2 is shown diagrammatically as a cuboid, in a greatly shortened form, in FIGS. 2 to 5. Its upper and lower surfaces may obviously be curved to suit the blade profile, and it may end in a portion of round cross-section at the foot of the blade, dependent on the shape of the fastening element.

The surface of the rotor blade is smooth and is coloured e.g. by lacquering. It is preferably formed by a thermoplastic film securely attached to the surface of the cross-binding 28; the film has been given the desired colour, preferably white, and thus also gives the blade its colour.

The distinctive feature of the rotor blade as described above is that there are no adhesive bonds critical to its safety, such as are normally present in blades of conventional construction. The blades have the further advantage of being very light. The fact that the whole area of the skin of the blade lies on the core makes the blade very resistant to denting. Furthermore, its production on winding machines can largely be automated.

It may well be desirable for the end element 8 located at the tip of the blade and tied to the blade by the binding 24 to have a certain mass. The end element 8 can then be used to balance the blade, with its weight being adapted by drilling out or adding compensating masses. In the case of short and thus very light blades it may also be helpful to have a greater weight at the tip, thereby greatly increasing the rotational inertia of the blade with only a slight increase in its weight. In this way the rotary speed of a wind turbine can be kept constant when there are slight fluctuations in wind speed.

If it is not necessary or desirable to have a certain mass at the tip of the blade, provided by the metallic deflecting element 8 described above, there is no need to have such an end element tied to the rotor blade. The fibres of the unidirectional binding extending longitudinally of the spar element would then end at the tip of the rotor blade.

Figure 6:
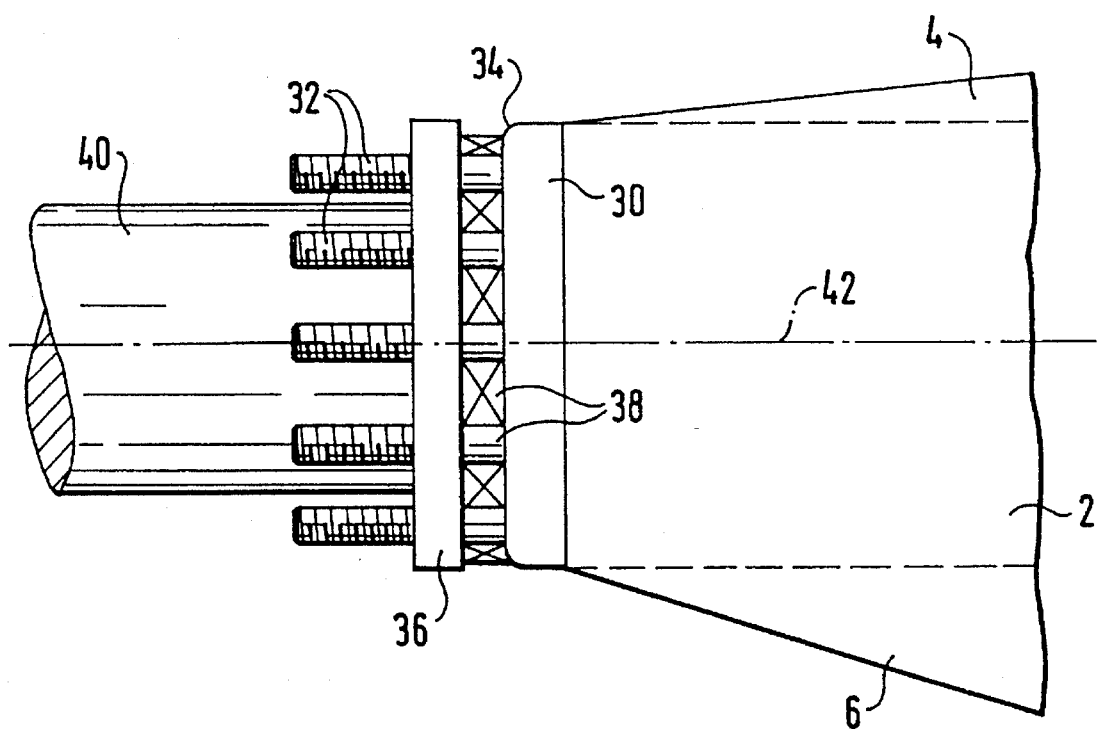
FIG. 6 shows the foot of a blade with a flanged ring as a deflecting and fastening element.

At the foot of the blade a flange attachment may be tied to the unidirectional binding 24 as a fastening element for the rotor blade, as illustrated in FIG. 6. Here a flanged ring 30 is arranged at the foot end of the spar element 2 and provided with fastening bolts 32 axially parallel with each other and with the longitudinal axis 42 of the rotor blade. The outer edge 34, which faces away from the rotor blade and over which the fibres are guided, is rounded. The unidirectional fibres can then be placed around these fastening bolts and deflected in the binding process. A flanged ring of this type is required, for example, when rotor blades have to be attached to hubs with an adjustable mechanism. A preferably annular covering flange 36 is provided to protect the fibres 38 placed over the flanged ring 32; when binding is completed it is put over the fibres 38 lying on the flanged ring. The flanged ring 30 is fixed detachably to a shaft 40, by which it can be clamped into a winding machine as will be described later.

The spar element of the core as described above does not have enough rigidity for a binding operation. Hence it must be held in an extended position during the manufacture of the rotor blade. A method for coreless production of rotor blades according to the invention on a conventional winding machine will now be described.

A winding machine 48 is shown diagrammatically in FIG. 7. Grip heads 60, 62, rotatable about coaxial axes 56, 58, are arranged in two housings 50, 52 which are spaced apart on a common bed 54. The heads can be driven synchronously in known manner. Details of them need not be described here.

The housing 52 is arranged on the bed 54, adjustably in an axial direction as indicated by the double arrow 64. A drive is provided for adjustment, shown here diagrammatically as a hydraulic drive 66 which is coupled firstly to the bed 54 of the machine and secondly to the adjustable housing 52.

Right-angled holders 68 with an axial limb 70, which is clamped in the grip heads 60, 62 so that they cannot rotate but can bear an axial load, are provided to receive the end elements 8, 10 of the rotor blade. The holders 68 have a supporting limb 74, extending across the axis of rotation 58, at the end of their right-angled portion 72. The end elements 8, 10 are placed on these limbs 74 and fixed relative to each other according to the binding to be applied. Discs 76 defining the binding space are attached to the supporting limbs 74 on both sides of the end elements 8, 10.

The thread guide, of the normal construction, is symbolised here by the thread eye 78; it is displaceable in three directions, viz the direction y running parallel with the axis of rotation 56, 58 in its longitudinal direction, and those crossing the axis of rotation in the vertical direction w and the horizontal direction z. All movements of the eye required to make the bindings can be carried out with these three directions. The distance between the supporting limb 74 and the limb of the righ-tangled portion adjoining the axial limb 70 must be selected so as to leave enough space for guiding the thread in the binding process.

A method of making rotor blades according to the invention using a winding machine with the features described will now be described.

As illustrated in FIG. 8 a unidirectional holding binding 80, comprising at least two spaced loops with fibre runs 82, 84 spaced one above the other, is first placed over the end elements 8, 10 which are arranged at an appropriate spacing on the holders 68.

Figure 9:
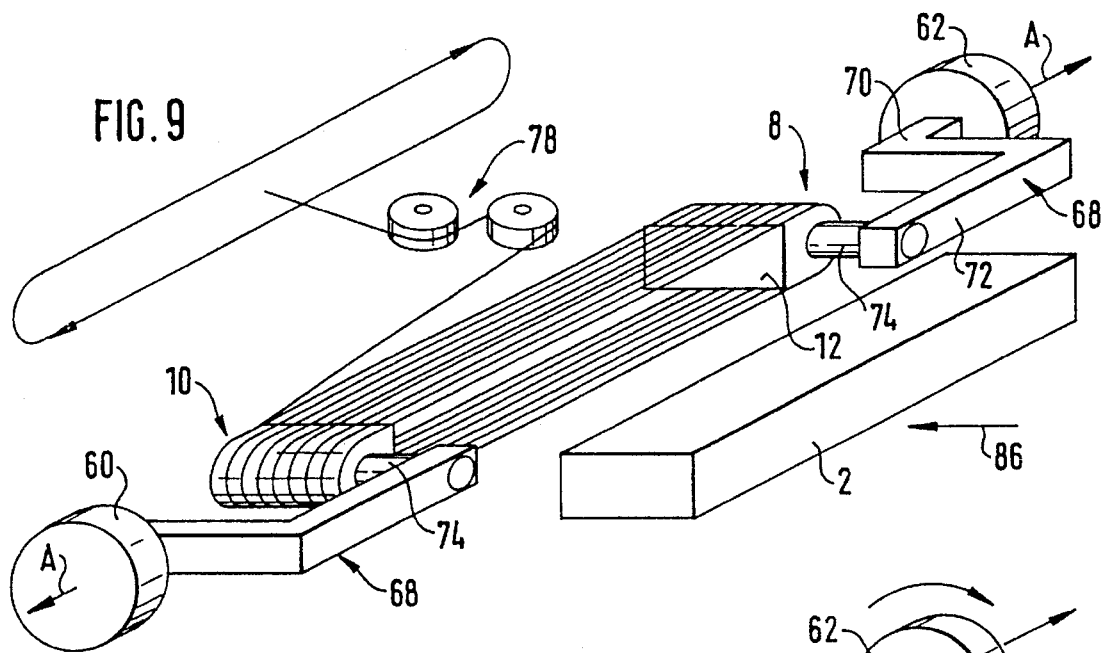

When the holding binding 80 has been positioned it is pre-tensioned—as indicated by the arrows A—for example by means of the adjustment drive 66. The spar element 2 is inserted between the pre-tensioned fibre runs 78, 80 of the holding binding 80 from the side in the direction of the arrow 86 as illustrated in FIG. 9. The pre-tension is selected, or increased after insertion of the spar element, so that the spar element is held in an extended position by the fibre runs 82, 84 without any sagging.

When the spar element 2 has been inserted between the runs of the holding binding, winding of the binding 24 of unidirectional fibres extending longitudinally of the spar member 84 is completed. To improve shear coupling an inner cross-binding may first be applied to the holding binding following the insertion of the holding element 2. The spar element is turned about the axes of rotation 56, 58 for application of the inner cross-binding.

Figure 10:
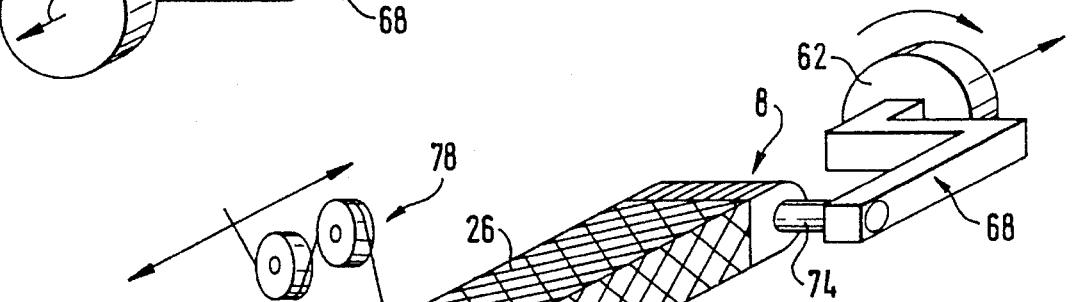
Figure 11:
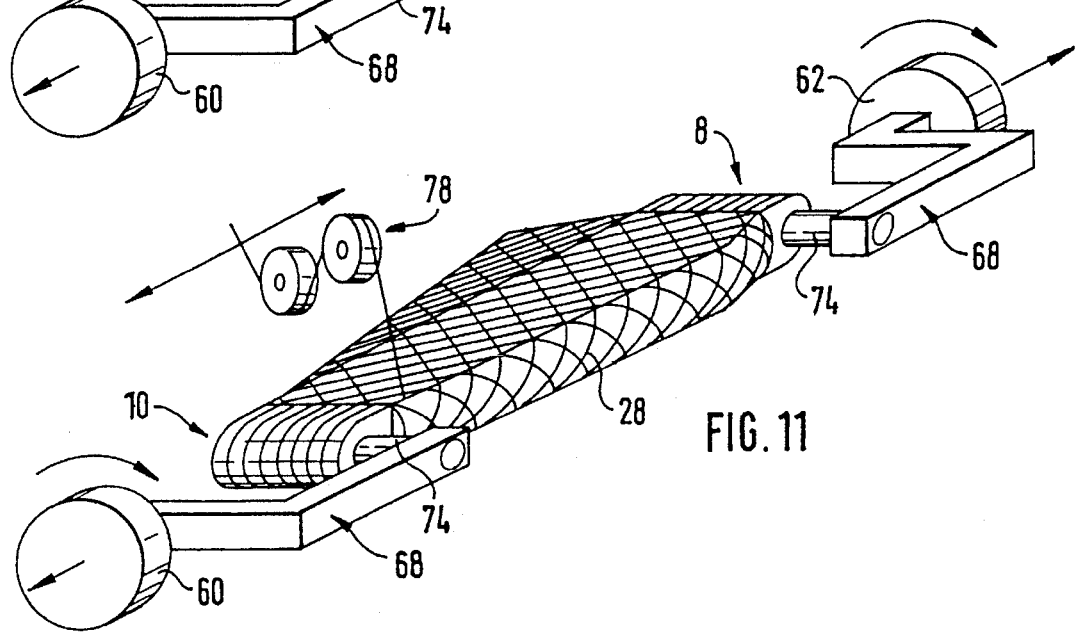

After the completion of the binding 24 of unidirectional fibres the cross-binding 26 is applied, as illustrated in FIG. 10, with the spar element being rotated about the axis 56, 58. When the cross-binding 26 has been completed the front and rear profile elements 4, 6 are attached to the transverse pegs 21 in the spar element 2, shown in FIG. 5. The cross-binding 28 which forms the skin of the rotor blade is thereupon applied, as illustrated diagrammatically in FIG. 11.

Pre-tensioning is maintained until the cross-binding 28 is completed. It does not however affect the tension in the runs of the unidirectional binding, which are coiled after the final value for the pre-tension in the holding binding 80 has been reached. Pre-tensioning may nevertheless be further increased momentarily after the unidirectional binding has been completed, in order to stretch the fibres.

When the outer cross-binding 28 has been completed pre-tensioning is terminated and the rotor blade with its end pieces 8 and 10 is taken off the supporting limbs 74 of the holders 68 and deposited in the bottom component 88 of a two-component mould 86 which is divided in the plane of the blade. For this purpose the bottom component 86 of the mould is inserted in the winding machine preferably immediately below the rotor blade blank coiled in the manner described above; it may, for example, be moved into the machine on appropriate guide rails 90.

The rotor blade blank, which is still unstable after the binding operation, reaches its final extended position in the bottom mould component 88. The mould is then closed by a top component (not shown) and the blank is pressed inside it. The fibre layers, which can be impregnated with a resin are compressed in the pressing process, with the resin being squeezed into the gaps and surplus resin being squeezed out. After the pressing process the blank is cured in the mould and preferably heated for the purpose. The two mould components are preferably metal moulds which can be heated.

Pressing with external pressure on the mould may create difficulties and incur high expenditure, particularly with rotor blades which are very long, e.g. longer than 12 m. Inflatable core elements 2, 4, 6 in the form of hollow bodies are advantageous in such cases. The pressure in the mould can be built up by compressed air passed into the hollow bodies, which presses the windings against the walls of the mould from the inside.

Particularly little surface roughness is obtained if the surface of the rotor blade is coated with a thermoplastic film. Such coating may be effected in the mould. For this purpose the mould is lined with an appropriately pre-formed thermoplastic film, which is joined securely to the resin in the curing process. With a film thus inserted in the mould it is unnecessary to apply release agents to the mould. The film can be given the desired colour and thus determine the final colour of the rotor blade, white preferably being selected for thermal reasons.

Rotor blades of the type described may be bound with pre-impregnated fibres. It is also possible to bind them dry and then impregnate the binding with the resin in known manner. For this purpose a pressure below atmospheric may, for example, be generated in the closed mould and the resin injected into it.

Figure 12:
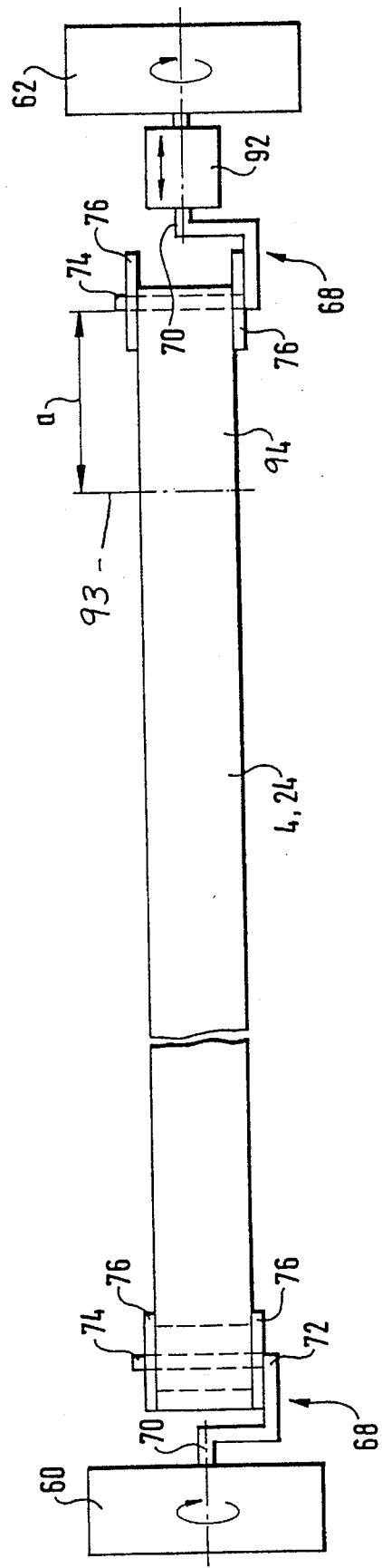

As mentioned above, the rotor blade may be constructed without a metallic end element tied to its tip. This is particularly the case with rotor blades of a considerable length. The height of the blade profile may be small in the region of the tip 93. In such cases the unidirectional binding 24 extending longitudinally of the spar element may be wound over the supporting limb 74 of the holder 68 at a distance a from the tip 93, as shown in FIG. 12. The distance between the supporting limbs 74 of the opposing holders 68 is adjusted accordingly. When the blade has been deposited in the bottom mould component 88 the overlapping section 94 of binding is severed.

The fibres may be wound in the form of rovings or strips. The material used may be glass fibres, carbon fibres, silicon carbide fibres or other known high-strength fibres, according to the strength properties required.

The pre-tensioning of the holding binding 75 may, as described, be applied by means of the adjustment drive 66 of the winding machine. Alternatively tensioning means may be provided on or in one of the grip heads. Thus tensioning means 92 may be incorporated in the axial limb 70 of one of the holders 68 as indicated diagrammatically in FIG. 12. The tensioning means may be constructed for hydraulic, mechanical or other known types of operation.

Instead of a holder 68 with a supporting limb located across the axis of rotation 56, 58 a binding cap known per se may be provided to deflect the fibres at the pointed end of the blade; like the flanged ring 30 in FIG. 6 it may be fixed on a shaft clamped into the grip heads 60, 62. In the FIG. 6 embodiment the shaft 40 has a diameter slightly smaller than the inside diameter of the annular covering flange 36. When binding is effected at a distance from the ends of the fastening bolts 32 the covering flange may be fixed on the shaft 40. Thus the fibres of the binding 24 may be wound over the fastening bolts lying against the flanged ring 30.

It will be understood that the above description of the present invention is susceptible to various modifications, changes and adaptations.

What is claimed is:

1. A method of making rotor blades made of fibre-reinforced synthetic resin, the method using a winding machine with first and second opposing, aligned grip heads provided with a synchronous drive a holder for holding a fastening element non-rotatably in said first grip head, means held non-rotatably in said second opposing grip head, for deflecting blade fibres, and means for generating a tensile force axially of said grip heads, the method comprising the steps of making a holding binding comprising only a relatively small plurality of unidirectional fibre runs between said fastening element and said fibre-deflecting means, inserting a blade spar element between said runs of said holding binding, applying a tensile stress to said fibres of said holding binding, to such a degree that said blade spar element is held by said runs of said holding binding without sagging, applying further binding runs to complete said unidirectional fibre binding, applying a cross-binding to said unidirectional fibre binding with rotation of said grip heads, attaching front and rear blade profile elements, applying an outer cross-binding with rotation of said grip heads, releasing the thus bound rotor blade and lowering it into a first rigid component of a mould defining the profile of a finished blade, closing a mould with a second rigid mould component, pressing the rotor blade between said mould components and curing said blade in said mould.

2. A method according to claim 1, wherein an inner cross-binding is applied after said application of tensile stress to said fibres of said holding binding.

3. A method according to claim 1, employing as said fibre-deflecting means a metal insert, said insert being tied into said rotor blade at the tip of said blade.

4. A method according to claim 1, wherein the distance between said fastening element in said first grip head and said deflecting means in said second grip head is made greater than the length of said spar element.

5. A method according to claim 1, wherein a fastening flange with fastening bolts axially parallel with the spar axis is used as said fastening element, and said unidirectional fibres are wound over said fastening flange and deflected by said fastening bolts.

* * * * *